UNITED STATES PATENT OFFICE 2,509,155

PERHALOMETHYLCYCLOHEXADIENES

Waldo B. Ligett, Detroit, Mich., and Earl T. McBee, La Fayette, and Vincent V. Lindgren, West Lafayette, Ind., assignors to Purdue Research Foundation, West Lafayette, Ind., a corporation of Indiana No Drawing. Application November 13, 1945, Serial No. 628,374

3 Claims. (Cl. 260—648)

This invention relates to a novel group of unsaturated alicyclic halocarbons, particularly to perhalomethylcyclohexadienes, and specifically to the chlorofluoromethylcyclohexadienes.

Certain members of this group of compounds, especially those containing one or more —$CF_2$— groups in the ring, possess remarkable stability in certain chemical reactions. The presence of a —$CF_2$— group in these compounds imparts the said stability to the rest of the molecule. Our invention is therefore concerned with certain new, non-flammable halocarbons, which because of their said characteristics are useful as dielectrics and heat-transfer media. In addition, the compounds are useful as chemical intermediates.

The compounds may be prepared, for example, by treating the appropriate halogenated cyclic compound, preferably an aromatic halocarbon, with silver difluoride in a liquid-phase reaction, wherein the silver difluoride is suspended in a fluorocarbon and the aromatic halocarbon is added thereto. Another way in which the compounds may be prepared comprises treatment of an appropriate halogenated cyclic compound, e. g., pentachlorobenzotrifluoride, in a three-step reaction, using, for example, in the first step in the process, bromine trifluoride. The product from the bromine trifluoride reaction is then treated with antimony pentafluoride to replace, with fluorine, any bromine which may have been introduced in the previous step. As a final step, the product from the antimony pentafluoride treatment is dehalogenated with a suitable agent, e. g., zinc dust, and rectified, yielding a perhalomethylcyclohexadiene.

The invention herein is not concerned with the process of manufacture or the apparatus employed, but is concerned solely with the new group of compounds herein described and claimed. The following example illustrates one method by which members of this new group of compounds may be prepared, but is in no way to be construed as limiting the invention thereto:

The preparation of trichlorotetrafluoro(trifluoromethyl)cyclohexadiene and tetrachlorotrifluoro(trifluoromethyl)cyclohexadiene was accomplished as follows: A suspension of silver difluoride (1000 grams) in a liquid fluorocarbon medium was cooled to zero degrees centigrade and 150 grams of pentachlorobenzotrifluoride was added thereto with constant stirring over a period of four hours. Stirring was continued for an additional three hours, after which the reaction mixture was extracted three times with a fluorocarbon. The organic products were then distilled and the following fractions separated: (1) 100 grams, boiling from 40° to 80° centigrade at ten mm. of Hg; (2) 24 grams, boiling from 80° to 115° centigrade at ten mm. of Hg. The third fraction consisted of starting material. Fraction (1) was rectified and yielded two products, trichlorotetrafluoro(trifluoromethyl)cyclohexadiene and tetrachlorotrifluoro(trifluoromethyl)cyclohexadiene, identified as follows:

| Compound | B. P., °C. | Per cent Chlorine | |
|---|---|---|---|
| | | Found | Theory |
| $C_6Cl_3F_4 \cdot CF_3$ | 50 at 11 mm. Hg | 32.2 | 33.0 |
| $C_6Cl_4F_3 \cdot CF_3$ | 75 at 16 mm. Hg | 40.9 | 41.7 |

We claim:
1. A perhalo(trifluoromethyl)cyclohexadiene, selected from the group consisting of (1) trichlorotetrafluoro (trifluoromethyl) cyclohexadiene, $C_6Cl_3F_4 \cdot CF_3$, having a boiling point of approximately 50 degrees centigrade at 11 millimeters of mercury pressure, and (2) tetrachlorotrifluoro(trifluoromethyl) cyclohexadiene,

$$C_6Cl_4F_3 \cdot CF_3$$

having a boiling point of approximately 75 degrees centigrade at 16 millimeters of mercury pressure.

2. Trichlorotetrafluoro (trifluoromethyl) cyclohexadiene, having a boiling point of approximately 50 degrees centigrade at 11 millimeters of mercury pressure.

3. Tetrachlorotrifluoro (trifluoromethyl) cyclohexadiene, having a boiling point of approximately 75 degrees centigrade at 16 millimeters of mercury pressure.

WALDO B. LIGETT.
EARL T. McBEE.
VINCENT V. LINDGREN.

REFERENCES CITED

The following references are of record in the file of this patent:

Van der Linden: "Rec. trav. chim. des Pays-Bas," 57, 1075–86 (1938).
Van der Linden: "Rec. trav. chim. des Pays-Bas," 55, 569–76 (1936).
Van der Linden: "Rec. trav. chim. des Pays-Bas," 55, 421–30 (1936).
Barral: "Bull. Soc. chim. de France," third series, 13, 418–423 (1895).
Bigelow and Pearson: "J. A. C. S.," 56, 2773–74 (1934).